Oct. 20, 1970  T. F. LONGWELL ET AL  3,535,470

SEMICONDUCTOR MICROPHONE EMPLOYING TWO DIAPHRAGMS

Filed Dec. 19, 1967  2 Sheets-Sheet 1

INVENTORS
THOMAS F. LONGWELL
WILLIAM A. REIMER

BY

Leonard J. Kalinowski

AGENT

Oct. 20, 1970  T. F. LONGWELL ET AL  3,535,470

SEMICONDUCTOR MICROPHONE EMPLOYING TWO DIAPHRAGMS

Filed Dec. 19, 1967  2 Sheets-Sheet 2

3,535,470
SEMICONDUCTOR MICROPHONE EMPLOYING
TWO DIAPHRAGMS
Thomas F. Longwell, Des Plaines, and William A. Reimer, Wheaton, Ill., assignors to Automatic Electric Laboratories, Inc., Northlake, Ill., a corporation of Delaware
Filed Dec. 19, 1967, Ser. No. 691,820
Int. Cl. H04r 23/00
U.S. Cl. 179—110     3 Claims

ABSTRACT OF THE DISCLOSURE

A semiconductor microphone has two diaphragms of equal size and equal mass, mounted in parallel spaced relationship. One diaphragm carries a stress sensitive transistor and the other diaphragm carries a stylus with its shank extending toward the transistor so that its tip bears against a stress sensitive region of the transistor. Both diaphragms are enclosed within the support and one is allowed to respond to sound waves directed at the microphone so that these waves act differently on each of the diaphragms causing the stylus to vary the stress on the transistor so that microphone action is achieved. On the other hand, forces due to shock and vibration act in common on both diaphragms and do not act to vary the amount of stress on the transistor.

FIELD OF THE INVENTION

This invention relates to electromechanical transducers and, more particularly, to a semiconductor microphone which employs a stress sensitive semiconductor.

DESCRIPTION OF THE PRIOR ART

It has been shown in Review of Scientific Instruments, vol. 33, p. 1130, October 1962, that when a transistor is subjected to stress by a stylus held against a surface of the transistor by a mechanical bias force, the electrical characterstics of the transistor can be modulated by sound and microphone action can be achieved.

One prior art semiconductor microphone, shown in the copending U.S. application Ser. No. 481,752 of T. F. Longwell, filed Aug. 23, 1965, now issued as U.S. Pat. 3,435,156 on Mar. 25, 1969, and assigned to the same assignee as this application, has a transistor carried by the microphone diaphragm and a stylus, rigidly fixed with respect to the diaphragm edge, held against the surface of the transistor by a mechanical bias force. Sound waves impinging on the diaphragm modulate the bias force so that the electrical characteristics of the transistor are modulated by the sound waves. Other prior art semiconductor microphones perform similarly to the one referred to above, but are constructed with the stylus attached to the diaphragm and the transistor rigidly fixed.

These structures are sensitive not only to small acoustical forces, but also to the much larger shock and vibrational forces associated with normal microphone usage. Because the mass of the diaphragm and its attachments is of the order of one gram, even small accelerations due to shock and/or vibrations produce a total force which may exceed the elastic limit of the stressed transistor. With a bias force of approximately five grams, an acceleration as little as 10 g's may cause damage to the transistor.

Since there is no practical way to keep a microphone, especially a hand held microphone, from being subjected to shock and vibration, it is desirable to minimize the effects of shock and vibration within the microphone.

SUMMARY OF THE INVENTION

Accordingly, this invention provides a new semiconductor microphone comprised of a symmetrical structure having two similar sub-assemblies, one providing a non-rigid mounting for a stylus and the other providing a non-rigid mounting for a transistor. The microphone operates as a "balanced acceleration" system so that while a mechanical bias force holding the stylus against a surface of the transistor can be modulated by sound to achieve microphone action, there is no "net" change in the bias force in response to shock or vibration.

In one embodiment of the invention, two similar diaphragms are mounted on the two open ends of a cylindrically shaped support so that a cavity is formed between the diaphragms. A transistor having a PN junction is mounted on and carried by one of the diaphragms and a stylus is secured to and carried by the opposing diaphragm. The stylus extends into the cavity and the tip of the stylus bears on a region of the transistor surface so as to cause stress to be distributed over the PN junction. The stylus is held against the surface of the transistor by mechanical bias means. A cover, mounted on the support over one open end, encloses one diaphragm within the support. A similar cover, mounted on the support over the other open end, is apertured and only partially encloses the other diaphragm within the support so that forces due to sound waves directed toward the microphone acting differently on each of the diaphragms cause the stylus to vary the stress on the PN junction whereby microphone action is achieved. However, the microphone is insensitive to forces due to shock and vibration which act in common on both of the diaphragms so that there is no net change in the stylus position with respect to the transistor.

BRIEF DESCRIPTION OF THE DRAWINGS

A more thorough understanding of the invention will be gained from a consideration of the following detailed description in conjunction with the drawings in which.

DESCRIPTION OF THE PREFERRED EMBODIMENT

Figure 1:
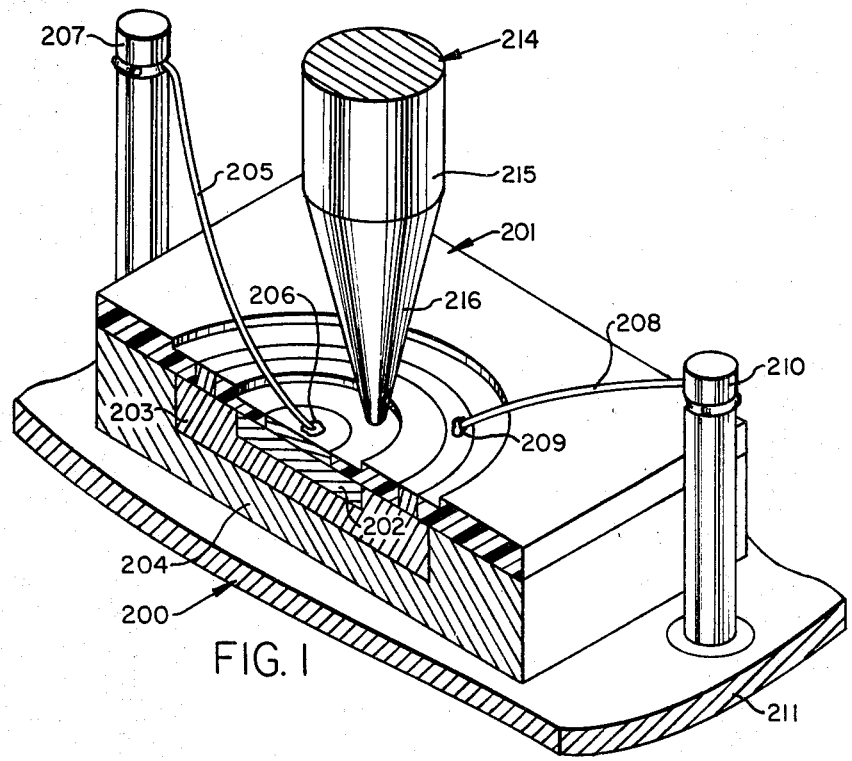
FIG. 1 is an isometric view of the surface of a transistor and the tip of a stylus contacting the emitter region.

FIG. 1 is an enlarged view of the transducing portion of the semiconductor microphone which comprises a semiconductor assembly 200, including a transistor 201 mounted on the top of a header 211, and a stylus assembly 214 positioned so that the tip of the stylus contacts the transistor on the silicon dioxide layer overlying its emitter region 202. When the transistor is stressed, the characteristics of the transistor, including the D.C. gain, are changed. Thus, when the transistor is electrically biased in its active region with its base current held constant, the transistor will respond to a change in stress by providing a change in output current so that the device, when stressed, will act as a microphone.

The emitter region 202 is centrally located on the surface of the transistor 201. The base region 203 surrounds the emitter region 202 and extends completely under the emitter region so that the main portion of the emitter-base junction is in a plane slightly below the surface of the transistor. The collector region 204 is comprised of the whole bottom portion of the transistor 201 and the area on the surface outside of the base area 203. The emitter lead 205 is attached to the emitter contact 206 on the emitter region and to a post 207, which is mounted in the header but insulated from it. The base lead 208 extends from the base contact 209 on the base region 203, to the post 210 which is mounted in, but insulated from the header. The collector of the transistor is in direct electrical and mechanical contact with the top of the header 211 on which the transistor is mounted.

As is shown, the stylus tip 216 contacts a small area of the surface of the transistor over the emitter region 202. Pressure applied to the stylus 214 is transmitted through the emitter layer with a resulting stress on the emitter-base junction which lies just beneath the surface. The stylus tip is positioned to contact the surface of the transistor within the emitter region 202 at a point other than the metalized emitter contact area 206.

Some of the problems associated with stylus positioning can be minimized by using a transistor which has a large emitter area. Greater sensitivity can be obtained by decreasing the emitter surface area so that the stylus will be positioned closer to the emitter-base junction; however, this sensitivity has been sacrificed to provide a more uniform sensitivity over the entire emitter region so that initial positioning of the stylus in the sensitive region is easier and, furthermore, minor displacements of the stylus within the surface of the emitter region after assembly will have little effect on the overall performance of the microphone.

Figure 2:
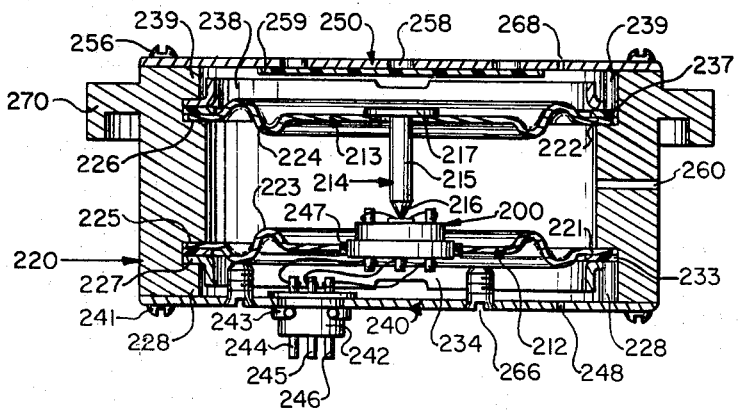
FIG. 2 is a cross-sectional view of a semiconductor microphone assembly according to one embodiment of the invention.

FIG. 2 is a sectional view of an assembled semiconductor microphone. Two similar diaphragms 212 and 213, one carrying the semiconductor assembly 200 similar to that of FIG. 1 and the other carrying the stylus assembly 214, are mounted on a steel, cylindrically shaped support 220 with the flat diaphragm edges 221 and 222 resting on shoulders 225 and 226 of support 220. Diaphragm 212 is mounted over one of the two open ends of the support, whereas diaphragm 213 is mounted over the other open end and is spaced apart from diaphragm 212 so that a cavity is formed between the diaphragms.

Diaphragm 212 is clamped against a shoulder 225 of the support by means of a nylon washer 233 and a twist-lock ring 234. The washer insures that the diaphragm will be tightly clamped and that an acoustic seal will be provided between the shoulder 225 and the diaphragm 212. The lock ring has flanges 227 which extend between ribs 228 on the support when the lock ring is initially positioned on the support. When in this position, the lock ring is then pushed toward the shoulder so that the washer and the diaphragm edge are wedged between the shoulder and the lock ring, and then the lock ring is rotated until the flanges are located in the recesses formed between the bottom of each rib and the support shoulder.

Similarly, diaphragm 213 is clamped against a shoulder 226 by nylon washer 237 and twist-lock ring 238. Lock ring 238 is locked under ribs 239 in the same manner as lock ring 234.

Diaphragm 212 is made of a thin circular sheet of aluminum and is substantially flat, except for an expansion relief 223 near its outer periphery. The diaphragm edge is clamped to the support 220 as described above. While the diaphragm edge is rigidly clamped, the portion of the diaphragm away from its edge is movable and can flex in response to accelerations due to movement of the support.

The transistor assembly 200 is affixed to a diaphragm 212 by a suitable adhesive, such as epoxy. A ring 247 of electrically insulating material insulates the header from the diaphragm. The transistor, mounted near the center of the diaphragm and movable therewith, has it pressure sensitive emitter region facing into the cavity toward diaphragm 213.

A cover plate 240 is attached to support 220 by screws 241 to enclose diaphragm 212 and the semiconductor assembly within the support, and prevent sound waves from impinging on diaphragm 212. The cover carries a connector 242 held in place by a snap ring 243 and having terminals 244, 245, 246 to which the emitter, collector and base leads of the transistor are connected and thereby extended to the outside of the housing. Air hole 248 permits the pressure within the cavity formed between diaphragm 212 and the cover 240 to adjust to the pressure outside of the support.

The stylus assembly 214 which includes a steel shank 215, a sapphire tip 216 and a steel mounting disc 217 is secured to diaphragm 213 by a suitable adhesive. Diaphragm 213 is similar to diaphragm 212 in size, shape, compliance and mass and has its edge 222 clamped to shoulder 226 of the support. The stylus assembly is secured to the diaphragm at a point opposite the mounting point of the semiconductor assembly 200. The diaphragm is flexible at points away from its clamped edge so that the stylus assembly, secured to the diaphragm near its center, is mounted movably with respect to the diaphragm edge.

Diaphragm 213 can flex in response to forces due to movement of the support or to forces caused by sound directed toward the microphone. The diaphragm 213 is enclosed within the support by a cover plate 250, mounted on support 220 by screws 256. The cover plate has apertures 258 to permit acoustic forces to be transmitted to diaphragm 213 so that, unlike diaphragm 212, which is enclosed within the support, diaphragm 213 is allowed to respond to sound waves.

A circular anticontamination shield 259 is secured by its edges to the back surface of the cover plate 250 and over the apertures, to prevent a person using the microphone from blowing directly onto the stylus bearing diaphragm 213 and also to prevent the entry of mositure which could alter the characteristics of the diaphragm or cause a change in the bias force. The shield 259 is thin and pliable, so that sound pressure forces to be detected by the microphone are transmitted to diaphragm 213 through the medium of the air in the cavity formed between the cover plate 250 and diaphragm 213. An air hole 268 in the cover plate permits equalization of pressure with the cavity formed by front plates 250 and diaphragm 213.

The stylus shank 215 extends into the cavity formed between the two diaphragms and toward the semiconductor assembly carried by diaphragm 212 so that the stylus tip 216 bears against the stress sensitive surface of the transistor and movements of the diaphragm 213 carrying the stylus will be transferred to the stress sensitive surface of the semiconductor through the medium of the stylus.

The stylus assembly is similar to the semiconductor assembly in size and mass, and the radius of the mounting disc 217 is substantially equal to the radius of the header 211, so that the characteristics of the diaphragm assembly consisting of the diaphragm 212 and the semiconductor assembly 200 are equal to the characteristics of the diaphragm assembly consisting of the diaphragm 213 and the stylus assembly 214. Consequently, shock and vibration due to movement of the microphone will cause both diaphragm assemblies to accelerate equally producing no net change (no modulation) in the bias force; while on the other hand, sound pressure will cause only diaphragm 213 to be affected, producing a change (modulation) in the bias force; and the movements of diaphragm 213 will be coupled to the emitter region of the transistor, and microphone action will be achieved.

In the assembly of the microphone, the stylus is positioned relative to the emitter region of the semiconductor prior to being secured to the diaphragm 213. A micropositioner (not shown) has a fixture which includes an electromagnet for holding the stylus by its mounting disc 217. Using a miscroscope (not shown) to view the semiconductor positioned within the cavity formed by the lower diaphragm 212 and the side walls of support 220, the stylus is lowered into the cavity until its tip is in contact with the emitter region at the desired position. Once the desired position is obtained, the stylus is moved orthogonally to the surface, up and out of the support 220.

After diaphragm 213 is mounted on shoulder 226 of the support and locked in place by ring 238 and washer 237, the stylus is moved back into the cavity by means of the micropositioner until the tip of the stylus contacts the surface of the transistor. Once positioned, epoxy is used to secure the stylus to the diaphragm, and, when the epoxy is set, the stylus is released from the micropositioner.

The stylus tip is held against the surface of the transistor by means of a bias force which is applied by screws, such as 266. The screws are inserted in threaded apertures in back cover plate 240. Three such screws are provided, spaced apart equally distant from one another along the perimeter of the cover 240. The end of the screw contacts the diaphragm at its expansion relief 223 near the outer edge so that diaphragm 212 is deflected slightly, carrying the semiconductor assembly toward the stylus. The mechanical bias is selected so that the sound waves to be picked up by the microphone will be reproduced with minimum distortion and maximum aplitude.

The amount of bias force applied is dependent upon the transistor used and the point at which the stylus tip contacts the emitter region. One method of determining the most sensitive regions and the optimum amount of bias force is described in U.S. Pat. 3,312,790 of M. E. Sikorski. Curves reproduced in this patent show the relationship between mechanical bias forces and various transistor currents. The desired bias force is applied by adjusting bias screws 266, while monitoring certain electrical parameters, such as collector current, base current, etc.

An air hole 260 is provided in one wall of support 220 to permit equalization of the pressure inside the inner sealed cavity, formed by the two diaphragms, with the atmospheric pressure outside of the support to prevent a change in the bias force on the stylus due to a change in atmospheric pressure.

Mounting ring 270 of the outside of the support 220 facilities mounting of the microphone assembly both during the assembly process and in use. The microphone is insensitive to clamping forces because there is no compression of the holder due to clamping of the mounting ring.

Figures 3, 4:
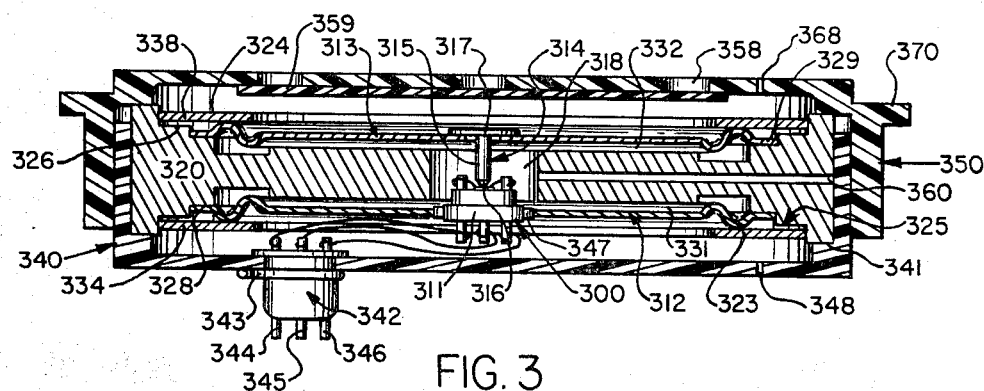
FIG. 3 is a cross-sectional view of a semiconductor microphone according to a second embodiment of the invention.
FIG. 4 is an exploded view of the semiconductor microphone of FIG. 3.

Referring to FIGS. 3 and 4, there is shown an alternate embodiment of a semiconductor microphone which includes a solid aluminum disc-shaped support 320 having shoulders 325 and 326 on opposite faces for mounting similar diaphragms 312 and 313 spaced apart from one another by the support.

The diaphragms 312 and 313 are made of aluminum and are circular and substantially flat except for an expansion relief 323 and 324 near their respective edges. The diaphragms have their edges mounted on shoulders 325 and 326 respectively, and secured thereon by an adhesive.

A semiconductor assembly 300, including a transistor attached to a header 311, is mounted on and carried by a movable portion of diaphragm 312 and is shown mounted at the center of the diaphragm. Support 320 has an aperture 318 near its center so that the centers of the two diaphragms which are mounted on opposite faces of the support oppose one another. The diameter of the aperture 318 is approximately the same as the diameter of the header 311 and is of a much smaller diameter than the diaphragm itself. The diaphragm is spaced apart from the portion of the support that extends from shoulder 325 to the aperture 318 so that a small cavity 311 is formed between the support and the diaphragm. The transistor assembly is mounted on diaphragm 312 so that its stress sensitive surface faces into the aperture 318 and toward diaphragm 313.

A stylus assembly 314, which includes an aluminum shank 315, sapphire tip 316, and steel mounting disc 317, is secured to diaphragm 313 by an adhesive near the center of the diaphragm adjacent aperture 318. The stylus shank extends into the aperture 318 toward diaphragm 312 so that the stylus tip 316 bears against the stress sensitive surface of the transistor.

The diameter of mounting disc 317 is approximately the same as that of the header 311 and aperture 318.

Prior to being secured to diaphragm 313, the stylus assembly 314 is positioned with respect to the emitter region of the transistor in the same manner as described previously with respect to the embodiment of FIG. 2.

Diaphragm 313 is spaced apart from the portion of the support that extends from shoulder 326 to the aperture 318 so that a cavity 332 similar to the cavity 331 is formed.

The mechanical bias force is applied by means of a pair of bias rings 334 and 338 of the same material as support 320. While held in a suitable fixture (not shown), the bias rings are mounted on the support shoulders 325, 326 and over the diaphragm edges. The bias rings contact the diaphragms on a portion of their expansion relief and apply bias force to the stylus by urging both diaphragms toward the support, while the edges of the diaphragms abut the side walls 328 and 329 of the support so that the stylus and the transistor are moved toward one another. The bias rings are bonded into place by means of a suitable adhesive such as epoxy. The fixture maintains the bias rings in a position to provide the desired bias force until the rings become firmly bonded to the support.

The transducer assembly is enclosed in a two-piece plastic housing consisting of cuplike members which afford shock mounting for the assembly and enclose the diaphragms. The base 340 of the housing has an integrally formed shoulder 341 on which the support 320 rests. Diaphragm 312 is enclosed within the housing and is spaced apart from the base of the housing so that a cavity is formed. This cavity facilitates the making of connections to the emitter, base, and collector leads of the transistor, which are extended to the outer side of the housing by a connector 342 which has three terminals 344, 345 and 346, each having one end extending into the cavity and the other end outside the housing. The connector is inserted into an aperture 349 in the housing and held in place by a retaining ring 343.

The cover 350 of the housing fits tightly over the base and encloses diaphragm 313 within the housing. The cover has apertures 358 which permit acoustic forces to be transmitted to diaphragm 313 so that, unlike diaphragm 312, diaphragm 313 is allowed to respond to sound waves. The cover is spaced apart from diaphragm 313 so that a cavity is formed therebetween similar to the cavity between the base and diaphragm 312. Air pressure changes in the cavities due to atmospheric pressure changes are equalized by means of an air hole 360 formed in the side wall of the support 320 and air holes 348 and 368 formed in the base an cover, respectively. There is sufficient leakage between the support and the base and cover to permit air hole 360 to be effective. A circular anticontamination shield 359 is secured by its edges to the back surface of the cover over the apertures 358.

Mounting ring 370 is an integrally formed part of the cover and facilitates mounting of the semiconductor microphone during use. Since the housing is less rigid than the support, the housing will absorb stresses introduced when the housing is clamped, and there will be no change in the mechanical bias force on the stylus as a result of mounting the microphone during use.

From the foregoing, it is apparent that applicants have provided a semiconductor microphone which is insensitve to accelerations caused by shock or vibration and, consequently, may be used, for instance, as a telephone transmitter in a telephone subset, an application in which the microphone will frequently be subjected to sizable shock forces each time the handset, in which the microphone is mounted, is replaced in the subset cradle or whenever the handset is dropped by the user. By the nature of its construction, the semiconductor microphone is capable of withstanding the shock and vibration associated with normal telephone usage without damage to its sensitive transducer assembly.

Although the semiconductor microphone of this invention has been described with reference to particular embodiments, there are ways in which the microphone may be changed without departing from the true spirit and scope of the invention. For instance, while the stylus has been shown rigidly secured to one diaphragm and the semiconductor mounted on the other diaphragm, it is possible to mount a light mass stylus on the diaphragm which carries the transistor and in mechanical contact with the stress sensitive region of the transistor and to employ other mechanical means to couple the stylus and the stress sensitive region of the transistor to the other diaphragm.

What is claimed is:

1. A semiconductor microphone assembly comprising: a generally cylindrical support member; first and second similar diaphragms mounted therein by the edges thereof in parallel spaced relationship with one another and coaxially with said support member; a cover member having a plurality of apertures therein and mounted at one end of said support member, coaxially with said diaphragms and with said support member, so as to face said second diaphragm on one side thereof; a semiconductor assembly including a semiconductor having a stress sensitive surface for providing a change in output in its current characteristic in response to a change in stress on said surface, said semiconductor assembly being mounted on said first diaphragm with said stress sensitive surface facing the other side of said second diaphragm; a stylus assembly including a stylus having a shank with a mounting portion on one end and a tip portion of the other end, said mounting portion being secured to said second diaphragm with said tip portion engaging said stress sensitive surface of said semiconductor, said second diaphragm being actuated by acoustical forces impinging thereon via said apertures for varying the stress on said stress sensitive surface; said first and second diaphragms having substantially equal masses and said semiconductor assembly and said stylus assembly having substantially equal masses, whereby mechanical forces acting on said support member cause the portion of said first and second diaphragms, internal of their edges, to move in the same direction and substantially with the same acceleration; whereas said acoustical forces impinging on said second diaphragm cause said internal portion thereof to transmit said forces by way of said stylus to said stress sensitive surface of said semiconductor for moving said internal portion of said first diaphragm in the same direction as that of said second diaphragm, but with different acceleration.

2. A semiconductor microphone assembly in accordance with claim 1, including an adjustable mechanical bias means mounted on said support member and contacting said internal portion of at least one of said diaphragms at a point adjacent said edge mounting for maintaining said tip portion of said shank against said stress sensitive surface of said semiconductor.

3. A semiconductor microphone assembly in accordance with claim 1, including a disc-shaped member mounted within said cylindrical support and coaxially therewith; said disc-shaped member having a peripheral shoulder formed on each side thereof for providing said edge mounting of said first and second diaphragms and a central aperture for accommodating said shank of said stylus; a pair of ring-shaped biasing members; and means included on each of said peripheral shoulders for mounting one of said ring-shaped members over the corresponding said diaphragm mounted on each said shoulder and contacting each said internal portion of said diaphragm at a point adjacent said edge mounting for slightly deflecting each said internal portion towards one another, whereby said tip portion of said shank is maintained against said stress sensitive surface of said semiconductor.

References Cited

UNITED STATES PATENTS

| 3,251,953 | 5/1966 | Lanti | 179—110 |
| 3,414,689 | 12/1968 | Gummel et al. | 179—110 X |
| 3,427,410 | 2/1969 | Diamond | 179—110 |

KATHLEEN H. CLAFFY, Primary Examiner

T. L. KUNDERT, Assistant Examiner